July 25, 1967  J. E. WEIN  3,332,338

FOOD COOKING APPARATUS

Filed July 29, 1964

INVENTOR.
JERRY E. WEIN
BY
ATTORNEY

United States Patent Office 3,332,338
Patented July 25, 1967

3,332,338
FOOD COOKING APPARATUS
Jerry E. Wein, New York, N.Y., assignor to Henry Kast Inc., New York, N.Y., a corporation of New York
Filed July 29, 1964, Ser. No. 385,865
11 Claims. (Cl. 99—330)

This invention relates to an apparatus for controlling the cooking of food and has specific relation to an electrical control means for automatically reducing the application of heat at a predetermined time interval, draining the hot liquid surrounding the food portions, and then applying cold water to the portions. The controlling apparatus is automatically arranged so that there is no dependence upon the experience or judgement of an operator.

Many types of control systems for processing food have been designed and been the subject of experiment but nearly all have had the disadvantage of not being able to determine and precisely fix the exact time for stopping the heating cycle. One of the most important parts of any cooking operation, and the quality and cost of food produced depends upon proper cooking time. The present invention uses standard equipment for the cooking of food portions but uses two thermal measuring instruments which determine the temperature of the fluid bath in which the portions are imersed and the temperature of the center of one of the food portions. The fact that a certain amount of the cooking action proceeds after the application of heat has been discontinued is also taken into consideration in the present invention. Prior art devices have failed to recognize that the latent heat in the masses of food and the receding cooking liquid continue the cooking process while the temperature is slowly reduced during draining. For this reason, in the present invention, the application of external heat is cut off a predetermined time interval before the temperature measuring device indicates that the food is fully processed.

An object of the present invention is to provide an improved apparatus for controlling the cooking of food which avoids one or more of the disadvantages and limitations of prior art arrangements.

Another object of the present invention is to insure proper cooking temperatures.

A further object of the present invention is to provide a means for cooking a large number of food portions in a single receptacle.

Still another object of the present invention is to provide an automatic system of control so that the food will be neither undercooked or overcooked, thereby causing shrinkage losses.

Another object of the present invention is to provide an automatic system of control which does not require constant supervision.

The invention comprises a receptacle which may be a double-walled steam heated container with means for applying steam and/or water to the interior of the receptacle and means for draining the water from the receptacle. A first temperature measuring means is employed for measuring the temperature of the water in the receptacle and a control means is connected to this measuring means for maintaining the temperature of the water at a desired value. A second temperature measuring means is inserted into one of the food portions at its approximate central position to determine its internal temperature. An electrical control means is connected to the secondary temporary measuring means for cutting off the application of heat when the temperature has reached a predetermined value. The electrical control means also energizes a valve for draining the fluid from the container. Another valve is energized for adding a cooling liquid to the receptacle after the draining of the hot fluid.

The invention consists of the construction, combination and arrangement of parts as herein illustrated, described and claimed.

In the accompanying drawing forming a part hereof, there is illustrated one form of embodiment of the invention, in which drawings similar reference characters designate corresponding parts, and in which.

Figure 1:
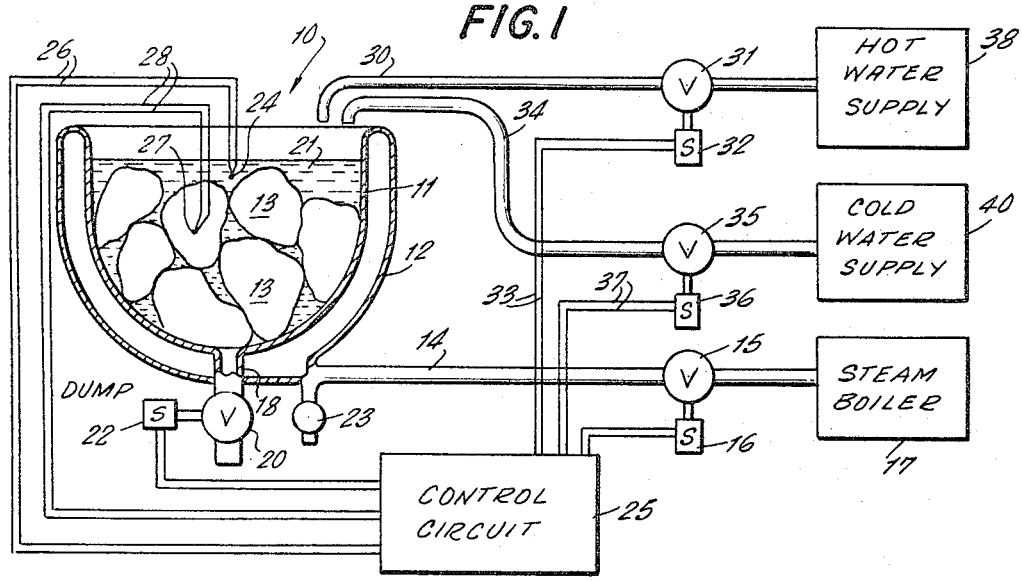
FIGURE 1 is a diagram showing the receptacle in cross-section, the valves and the control circuit.

Referring now to FIGURE 1, the invention includes a recpetacle 10, whic his preferably made with an inner wall 11 and an outer wall 12, these two walls defining a space for the application of steam or other hot fluid for heating the food portions 13 which are placed within the receptacle. The space between the walls is connected to a conduit 14 for the application of the heating fluid. Conduit 14 is connected to a valve 15 which is operated by a solenoid 16. A steam boiler 17 or other source of hot fluid is connected to the valve in the usual manner. The inner wall of the receptacle is connected to a conduit 18 and a valve 20 for draining a liquid 21 from the receptacle. Liquid 21 may be water, salt-water, or any other fluid that transmits heat from the walls 11 to the food portions 13. The valve 20 is operated by a solenoid 22 and operates to open the valve 20 when the solenoid is actuated. An automatic drip valve 23 may be connected to the steam conduit 14 to drain off the condensed steam during the application of heat but this component is not always necessary.

A first temperature measuring component 24 is inserted into the liquid 21 and is connected to a control circuit 25 by a pair of conductors 26 for maintaining the temperature of the liquid 21 within a predetermined temperature range. The component 24 may be a thermocouple, a thermistor, or any other type of electrical element which is sensitive to temperature change. A second measuring means 27 is inserted into the central area of one of the food portions 13 and is connected by conductors 28 to the control circuit 25. The function of these two measuring components will be described later.

A hot water conduit 30 is provided for filling the receptacle 11 at the start of the cooking operation. This conduit is connected in series with a valve 31 which is operated by a solenoid 32 and is connected to the control circuit 25 by conductors 33. After the cooking cycle is completed, cold water is run into the receptacle 12 through a conduit 34. This conduit is connected in series with a valve 35 which is operated by a solenoid 36 connected to the control circuit by conductors 37. A hot water supply 38 and a cold water supply 40, are indicated in FIGURE 1, by separate and individual storage tanks. It is understood that any source of supply may be used for this purpose.

Figure 2:
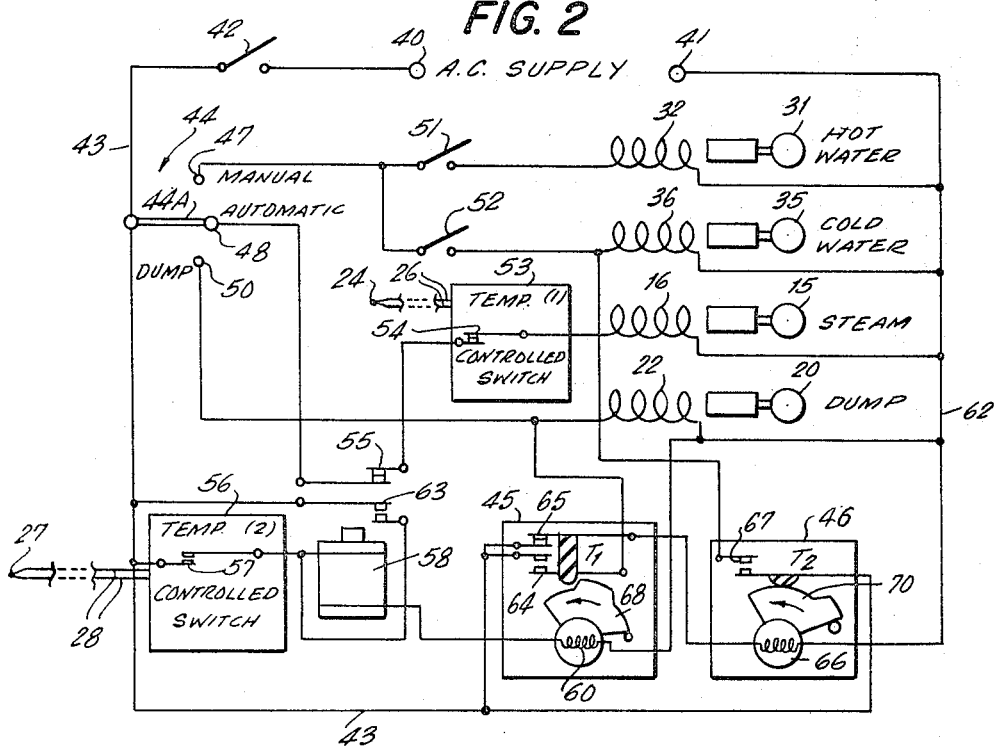
FIGURE 2 is a schematic diagram of connections showing the control circuit which includes the solenoid operated valves, the two temperature controlled switches, and two timers which delay the closing of switches by a predetermined time interval.

The diagram of connections shown in FIGURE 2 illustrates the details of the control circuit 25. This circuit includes terminals 40 and 41, which are to be connected to the usual alternating current power supply system. A main switch 42 is connected in series with terminal 40. A conductor 43 from the switch 42 makes connection with a selector switch 44 and two-time delay mechanisms 45, 46. In this diagram of connections the four valves 31, 35, 15 and 20, are indicated in connection with solenoids 32, 36, 16 and 22. Each solenoid is provided with the usual plunger which operates the valves.

The selector switch 44 has a single arm 44A which may be turned to make contact with a manual contact 47, an automatic contact 48, and a drain contact 50. When arm 44A is connected to the manual contact 47, a switch 51 may be used to operate the hot water valve to send hot water through conduit 30 and fill the receptacle. Also, in this position another switch 52 may be used to operate the cold water solenoid 36 and fill the receptacle with cold water.

When the arm 44A is turned to make contact with point 50, solenoid 22 is actuated and the drain valve 20 is opened thereby permitting the fluid contents 21 of the receptacle 11 to be drained off. It is contemplated that the majority of operations will be affected when the arm 44A is connected to point 48 as shown in FIGURE 2, and that the greater part of the cooking cycle proceeds with automatic control. For this reason, first temperature control switch 53 is connected to the temperature measuring component 24, this control switch operating a pair of contacts 54 connected in series with solenoid 16. A normally closed pair of contacts 55 and the automatic contact 48 are also in this circuit. This circuit turns the steam on and off, depending upon the temperature of component 24, so that the temperature of the fluid 21 remains within a narrow range of temperature values.

A second temperature control switch 56 is connected to the temperature measuring component 27 which is inserted within one of the food portions in the container. Switch 56 contains a normally open pair of contacts 57, connected in series between conductor 43 and a relay winding 58. Relay winding 58 is also connected through a motor winding 60 and conductor 61, which runs to a common conductor 62 connected to the second supply terminal 41. Current through the relay winding 58 operates the normally closed contacts 55 and the normally open contacts 63, the latter acting as locking contacts to retain the relay in its actuated condition until the main switch 42 is opened.

The first time control switch 45 contains a pair of normally open contacts 64 and a pair of normally closed contacts 65 which are connected in series with a motor 66 in the second time control switch 46. The second control switch contains a single pair of normally open contacts 67 connected in series with supply conductor 43 and the cold water solenoid 36. In FIGURE 2 the time control switches are indicated by motors 60, 66, together with cams 68, 70. The cams are rotated by the motor apparatus and the edges of the cams operate cam followers which open and close associated contacts. It is obvious that many other types of time delay switches may be used instead of the types shown. These types may be solenoid operated pistons with fluid delay means or solenoid operated mechanical devices having a delay means which include a set of gears and a fan. The present invention does not depend upon any particular type of delay means for operating the associated contacts.

The operation of this device is as follows: First, the food portions 13 are stacked within the receptacle 11. Next, the receptacle is filled with hot water by first closing the main switch 42, turning the selector switch to the normal contact 47, and closing switch 51 to operate solenoid 32 and valve 31 until the receptacle is filled. Under certain conditions the receptacle may be filled with cold water by operating switch 52 instead of switch 51. Next, the selector switch 44 is turned to the automatic contact 48 and the automatic features of the invention start their cycle. The steam valve 15 is opened by the action of solenoid 16, which receives its current from the automatic contact of the selector switch, closed contacts 55 on the relay 58 and closed contacts 54 in the automatic switch 53. The steam continues to circulate between the two walls 11 and 12 until the liquid 21 is heated to a predetermined temperature. When this temperature is sensed by component 24, contacts 54 open and the steam is cut off for a short time. The opening and closing of contacts 54 are the controlling means for keeping liquid 21 at a desired temperature.

The raised temperature of liquid 21 causes the food portions 13 to increase in temperature and to be cooked in the usual manner. When the center of one of these portions has risen to a predetermined temperature, the temperature measuring component 27 senses this temperature and contacts 57 within the control switch 56 are closed, thereby sending current from conductor 43, through relay winding 58, motor 60, to conductor 62, and the other supply terminal 41. This action actuates relay 58, closing contacts 63 and opening contacts 55. The same current flowing through motor 60 starts cam 68 to rotate and soon operates both switches within timing arrangement 45, closing contacts 64 and opening contacts 65.

When relay contacts 63 are closed, they lock the relay into its actuated condition and maintain contacts 55 open until the main switch 42 is again opened. When contacts 55 are opened, the current is cut off from solenoid winding 16 and the flow of steam is cut off by the closing of valve 15. As soon as the cam 68 in timer 45 operates the contacts, current flows from conductor 43 through contacts 64, through solenoid 22, to conductor 62, and terminal 41. This current operates the solenoid and opens the drain valve 20 so that the hot liquid 21 drains away from the food portions. Cam 68 is arranged with a raised portion so that contacts 64 and 65 remain in their actuated condition for about fifteen minutes so that all the hot water may be completely drained from the receptacle. At the end of this time interval, the raised portion of the cam passes from the cam follower and the contacts are returned to their normal condition. When contacts 65 are closed, current is sent from conductor 43 through the contacts and through the major portion 66 of the second timer 46. This timer turns cam 70 and after a predetermined time interval closes contacts 67 which apply current from conductor 43, through the contacts, through solenoid 36, to conductor 62, and the other terminal. This current opens valve 35 and turns on the cold water which fills the receptacle and chills the food portions within the container. If necessary, the level of the cold water within the container may be adjusted by manual means.

It should be noted that considerable time occurs from the opening of contacts 54 and the cutting off of the steam until the cold water covers the food portions and stops the cooking action. During this time, because of latent heat within the food portions and the receptacle, the cooking action continues. Experience coupled with some test operations can only determine the right temperature at which the steam should be withdrawn. However, many operations of this type have proved that this sequence of operations produces excellent food portions, well cooked, with a minimum weight loss due to shrinkage.

Having thus fully described the invention, what is claimed as new and desired to be secured by Letters Patent of the United States is:

1. Apparatus for controlling the cooking of food comprising, a receptacle adapted to receive a plurality of food portions and a heat transmitting fluid in contact with the food portions, means for heating the fluid and the portions of food, a conduit and valve for draining off the heated fluid, a first measuring means for determining the temperature of the fluid in the receptacle, a second measuring means adapted to be inserted into one of the food portions for determining its internal temperature, and an electrical control means connected to the second measuring means for cutting off the application to heat to the food portions when the temperature has reached a predetermined value, for draining the fluid within the receptacle, and for adding a cooling liquid to the receptacle.

2. Apparatus for controlling the cooking of food comprising, a receptacle adapted to receive a plurality of food portions and a heat transmitting fluid in contact with the food portions, means for heating the fluid and the portions of food, a conduit and valve for draining off the heated fluid, a first measuring means for determining the temperature of the fluid in the receptacle, a second measuring means adapted to be inserted into one of the food portions for determining its internal temperature, and an electrical control means connected to the second measuring means for cutting off the application of heat to the food portions when the temperaturre has reached a predetermined value, said conrol means including a temperature control switch coupled between said first measuring means and a solenoid operated valve which cuts off the means for heating said fluid and thereby regulates the temperature of the fluid to maintain it within a desired range of temperatures.

3. Apparatus for controlling the cooking of food comprising, a receptacle adapted to receive a plurality of food portions and a heat transmitting fluid in contact with the food portions, means for heating the fluid and the food portions, a conduit and valve for draining off the heated fluid, a measuring means adapted to be inserted into one of the food portions for determining its internal temperature, and an electrical control means connected to the measuring means for cutting off the application of heat to the receptacle and draining the fluid, said electrical control means including a relay having a winding coupled to said measuring means and a time delay device, said relay having a normally closed pair of contacts connected in series with an electrical control adapted to cut off the heating means, said time delay device having a motor connected in series with the relay winding and adapted to operate a pair of contacts which sends current through a solenoid and opens a valve to drain the fluid.

4. Apparatus claimed in claim 3, wherein said electrical control means also includes a second time delay means which is coupled to said first time delay means and controls a pair of contacts which are connected in series with a source of potential and a solenoid to open a valve and fill the receptacle with cold water.

5. Apparatus as claimed in claim 4, wherein said first time delay means includes a pair of contacts in series with said second time delay means so that the second time delay means starts to operate a predetermined time interval after the first time delay means starts.

6. An apparatus for cooking portions of food comprising, a receptacle adapted to receive food portions and a fluid, and means for applying heat to the fluid, the improvement which comprises a temperature measuring means adapted to be injected into one of the food portions, an electrical control circuit coupled to said temperature measuring means, a first conduit connected to said receptacle for draining the fluid therefrom, a first solenoid operated valve connected to said conduit, the solenoid portion of the valve connected to the electrical control circuit for actuation when the temperature of the food portion has reached a predetermined value, a second conduit connected to a cold water supply, a second solenoid operated valve connected to said conduit, the solenoid portion of this valve also connected to the electrical control circuit for actuation to fill the receptacle with cold water a predetermined time interval after the first solenoid operated valve has been actuated.

7. Apparatus as claimed in claim 6 wherein said electrical control circuit includes a time delay device which closes the first solenoid operated valve a predetermined time interval after it has been opened, said time interval adapted to permit all the fluid to be drained from the receptacle.

8. Apparatus as claimed in claim 6 wherein the second solenoid operated valve is operated by a second time delay device which opens the cold water valve a predetermined time interval after the first solenoid operated valve has been closed.

9. Apparatus as claimed in claim 6 wherein said fluid is connected to a supply means and its flow into the receptacle is controlled by a manually operated switch connected to a solenoid operated valve.

10. Apparatus as claimed in claim 6 wherein a switch is provided on the first conduit whereby said receptacle may be drained anytime by the manual operation of a said switch which is connected to the solenoid in the first solenoid operated valve.

11. Apparatus as claimed in claim 6 wherein said electrical control circuit includes a relay actuated by said temperature measuring means, said relay having a pair of locking contacts for locking the relay into its actuated condition until a main electrical supply switch is opened.

References Cited

UNITED STATES PATENTS

| | | | |
|---|---|---|---|
| 2,103,513 | 12/1937 | Campbell. | |
| 2,208,552 | 7/1940 | Walter. | |
| 2,321,235 | 6/1943 | Olson. | |
| 2,377,873 | 6/1945 | Finizie | 99—330 X |
| 2,510,526 | 6/1950 | Smith | 99—331 |
| 2,624,266 | 1/1953 | Colburn et al. | |
| 2,983,488 | 5/1961 | Thompson. | |
| 3,131,622 | 5/1964 | Rhyne | 99—330 |

BILLY J. WILHITE, *Primary Examiner.*